(12) United States Patent
Kim (10) Patent No.: US 12,459,461 B2
(45) Date of Patent: Nov. 4, 2025

(54) LAP PRETENSIONER INCLUDING A STRUCTURE TO LIMIT GAS EMISSIONS

(71) Applicant: WOOSHIN SAFETY SYSTEMS CO., LTD., Hwaseong-si (KR)

(72) Inventor: Ju Bong Kim, Seoul (KR)

(73) Assignee: Wooshin Safely Systems Co., Ltd., Hwaseong-Si (KR)

( * ) Notice: Subject to any disclaimer, the term of this patent is extended or adjusted under 35 U.S.C. 154(b) by 0 days.

(21) Appl. No.: 18/947,154

(22) Filed: Nov. 14, 2024

(65) Prior Publication Data

US 2025/0162535 A1     May 22, 2025

(51) Int. Cl.
*B60R 22/195*     (2006.01)
*F42B 3/04*     (2006.01)

(52) U.S. Cl.
CPC ............ *B60R 22/1954* (2013.01); *F42B 3/04* (2013.01)

(58) Field of Classification Search
CPC .............. B60R 22/1954; B60R 22/195; B60R 22/1952; B60R 22/201; B60R 22/28; F42B 3/04
See application file for complete search history.

(56) References Cited

U.S. PATENT DOCUMENTS

| 5,927,756 A | * | 7/1999 | Wier | ................... | B60R 22/1951 60/632 |
| 2018/0105134 A1 | * | 4/2018 | Kim | ..................... | B60R 22/1955 |
| 2018/0265035 A1 | * | 9/2018 | KohIndorfer | ....... | B60R 22/4628 |

FOREIGN PATENT DOCUMENTS

| DE | 20218869 U1 | * | 4/2003 | ......... B60R 22/1952 |
| EP | 1593559 A1 | * | 11/2005 | ......... B60R 22/1951 |
| GB | 2327919 A | * | 2/1999 | ........... B60R 22/195 |

* cited by examiner

*Primary Examiner* — Paul N Dickson
*Assistant Examiner* — Matthew D Lee
(74) *Attorney, Agent, or Firm* — McDonnell Boehnen Hulbert & Berghoff LLP (57) ABSTRACT

The present invention relates to a lap pretensioner including a structure to limit gas emissions comprises a connecting unit connected with the anchor or the buckle; and a pressure unit having an interior space formed therein into which a portion of the connecting unit is inserted, actuated by an impact on the vehicle to inject a fluid into the interior space, and moving a portion of the connecting unit in one direction under pressure of the fluid received therein to pull the anchor or the buckle; wherein the pressure unit is provided inside the interior space, and configured to allow fluid to move along the inside of a variable space that varies in response to the movement of the connecting unit.

16 Claims, 10 Drawing Sheets

PRIOR ART

LAP PRETENSIONER INCLUDING A STRUCTURE TO LIMIT GAS EMISSIONS

TECHNICAL FIELD

The present invention relates to a lap pretensioner including a structure to limit gas emissions, and more particularly to a lap pretensioner with a structure that completely prevents gas emissions from a micro gas generator under normal operating conditions to prevent safety accidents for passengers. Additionally, it includes a structure that prevents breakage and dislodgement of parts of the lap pretensioner under abnormal conditions, thereby preventing secondary accidents.

BACKGROUND ART

To ensure occupant safety in the event of a vehicle impact, the retraction of the webbing is restricted to keep the occupant properly positioned in the seat, minimizing secondary injuries during accidents.

However, simply restricting the webbing withdrawal does not fully prevent secondary damage since, unlike the restricted webbing, the anchor or buckle securing the webbing may still loosen, making it difficult to achieve complete occupant safety. So, recently, a method has been utilized to prevent safety accidents by improving the fixing force while moving the anchor or buckle to make the webbing closer to the passenger.

In particular, when the webbing is a lap belt used for waist restraint, in order to limit the withdrawal of the webbing according to a prior art, a method is utilized in which a fluid is generated through the ignition of the micro gas generator (MGG) by the impact of the vehicle, and an anchor to which the lap belt is joined or a buckle to which the lap belt is connected is introduced into the lap tensioner by the pressure of the fluid.

Figure 1:
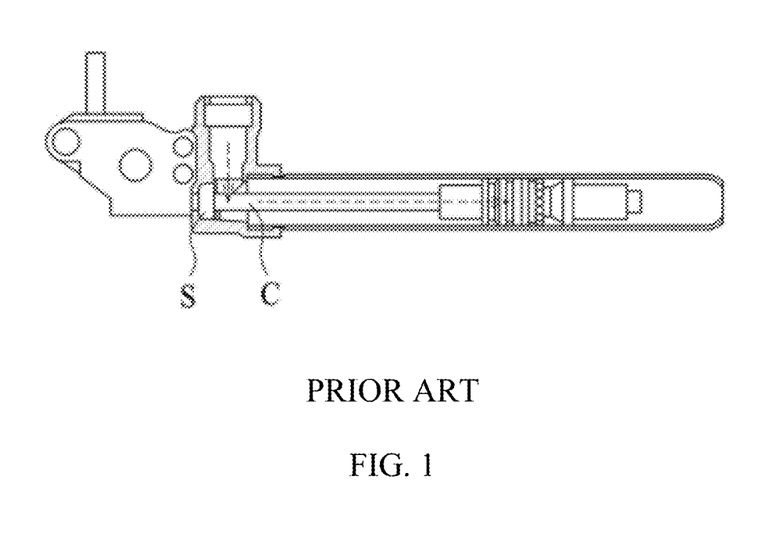
FIG. 1 is a drawing to illustrate a conventional lap pretensioner.

Although effective in mitigating secondary accidents, this method poses a problem: in the process of exhausting fluid generated by the activation, gas from the MGG can escape through the connection (C) path that enters the lap pretensioner, as shown in FIG. 1. This gas can then leak through the cable seal (S) due to gaps or inner spaces within the cable path, which may result in safety issues such as burns to occupants exposed to the fluid.

Moreover, conventional lap pretensioners often apply a "safety cover" that directs MGG emissions toward the vehicle body, considered a relatively safe direction. However, if autonomous vehicle seats become rotatable (up to 360 degrees) in the future, emissions directed at the car body could potentially endanger other passengers. This presents an additional safety challenge that the present invention seeks to address.

DISCLOSURE

Technical Problem

The present invention is designed to solve the problems of the prior art described above, and the present invention aims to provide a lap pretensioner including a structure for limiting gas emissions, including a structure that completely prevents MGG's gas emissions under normal operating conditions to prevent safety accidents for passengers, and a structure that prevents breakage and dislodgment of parts of the lap pretensioner under non-normal operating conditions to prevent secondary accidents.

The tasks of the present invention are not limited to those mentioned above, and other tasks not mentioned will be apparent to those skilled in the art from the following description.

Technical Solution

A lap pretensioner including a structure to limit gas emissions that is actuated by an impact on the vehicle to move the vehicle's anchors or buckles, comprising: a connecting unit connected with the anchor or the buckle; and a pressure unit having an interior space formed therein into which a portion of the connecting unit is inserted, actuated by an impact on the vehicle to inject a fluid into the interior space, and moving a portion of the connecting unit in one direction under pressure of the fluid received therein to pull the anchor or the buckle; wherein the pressure unit is provided inside the interior space, and configured to allow fluid to move along the inside of a variable space that varies in response to the movement of the connecting unit.

In addition, the pressure unit is configured that the fluid moves along the variable space when the pressure is below a predetermined value, and leaks from the variable space when the predetermined value is exceeded.

Further, wherein the pressure unit includes, a case part having an elongated interior space into which one end part of the connection unit is inserted and moved; a moving part having an one side fixed to one side of the interior space inside the case part, and the other side moved to the other side of the interior space upon movement of the connection unit to form the variable space; and an actuation part connecting to the interior space of the case part, and actuated in response to an impact on the vehicle, and injecting fluid toward the interior space of the case part.

Further, wherein the moving part is formed by a telescopic hollow tube with multiple ends connected, and has variable length.

Further, wherein the moving part includes, a fixed member arranged to receive the fluid into the interior, and fixed to one side of the interior space; a variable member having one end part connected to the interior of the fixed member, and arranged to slide in the direction of movement of the connection unit relative to the fixed member; and a piston member connected with the connection unit, and enclosing the other end part of the variable member, and forms the variable space that varies with movement of the connection unit.

Further, wherein the piston member is arranged to separate the interior space into a first space in which the fixed member is fixed and a second space in which the variable member is moved, and wherein the variable member and the piston member are moved into the second space by the pressure of the fluid contained in the first space, thereby moving one end of the connecting unit.

Further, wherein the pressure unit is arranged to leak the fluid into a disconnected space as the variable member is disconnected from the fixed member when the predetermined pressure is exceeded.

Further, wherein the pressure unit is arranged so that a safety region of the movable part located within the interior space protrudes outside the case part when the predetermined pressure is exceeded.

Further, wherein the moving part is formed in the form of a hollow tube with corrugations of variable length from one end to the other end.

In addition, the lap pretensioner including a structure to limit gas emissions further comprises an exhaust unit that the fluid contained within the pressure unit exhausts in a direction opposite to the position of an occupant of the vehicle.

Advantageous Effects

The lap pretensioner including a structure for limiting gas emissions of the present invention to solve the above problems has the effect of preventing safety accidents for passengers by completely preventing MGG's gas emissions in normal operation situations, and preventing secondary accidents by preventing breakage and dislodgment of parts of the lap pretensioner in abnormal operation situations.

The effects of the present invention are not limited to the aforementioned effect, and other effects, which are not mentioned above, will be apparent to a person having ordinary skill in the art from the description of the claims.

DESCRIPTION OF DRAWINGS

A detailed description of according to a preferred embodiment of the present application, which is described below and a summary described above will be able to be more well appreciated when reading the detailed description and the summary in association with the accompanying drawings.

Preferred embodiments are illustrated in the drawings for the purpose of illustrating the present invention. However, it should be appreciated that the present application is not limited to the illustrated accurate arrangement and means.

FIG. 5A through 7B are drawings intended to illustrate an operational state of a lap pretensioner including a structure for limiting gas emissions, in accordance with one embodiment of the present invention.

DESCRIPTION OF THE SYMBOL

10: lap pretensioner
100: connection unit
200: pressure unit
220: case part
240: moving part
260: actuation part
242: fixed member
244: variable member
246: piston member
248: sealing connection member
248*a*, 248*b*: protrusions
248*c*: groove
246*a*: safety region
300: exhaust unit

MODE FOR INVENTION

Hereinafter, a preferred embodiment of the present invention, in which a purpose of the present invention can be realized in detail will be described with reference to the accompanying drawings.

In describing the embodiment, the same name and the same reference numeral are used with respect to the same component and the resulting additional description will be omitted.

Figure 2:
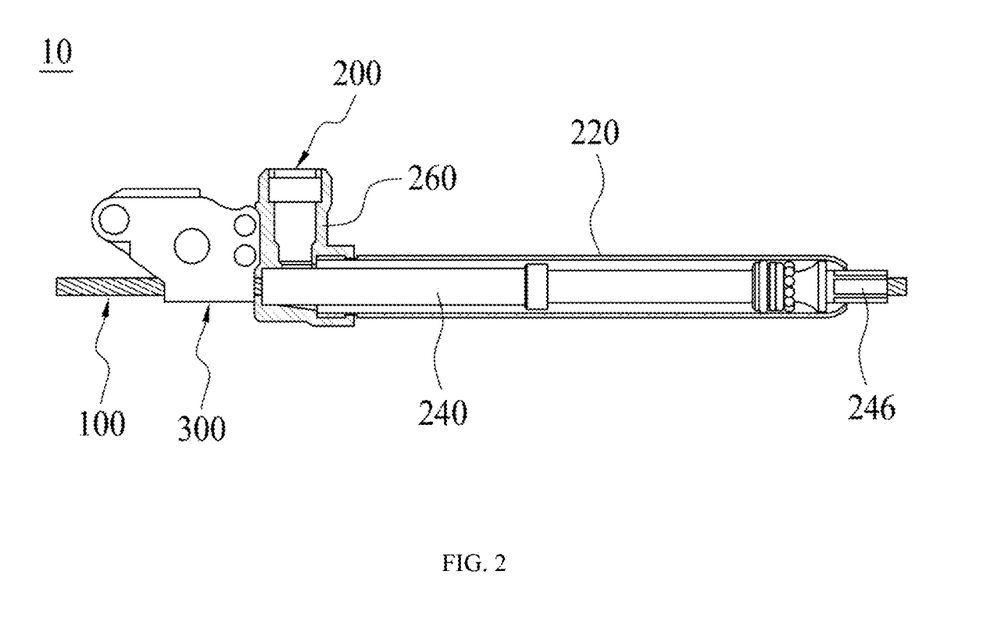
FIG. 2 is a drawing to illustrate a lap pretensioner including a structure to limit gas emissions, according to one embodiment of the present invention.
Figure 3:
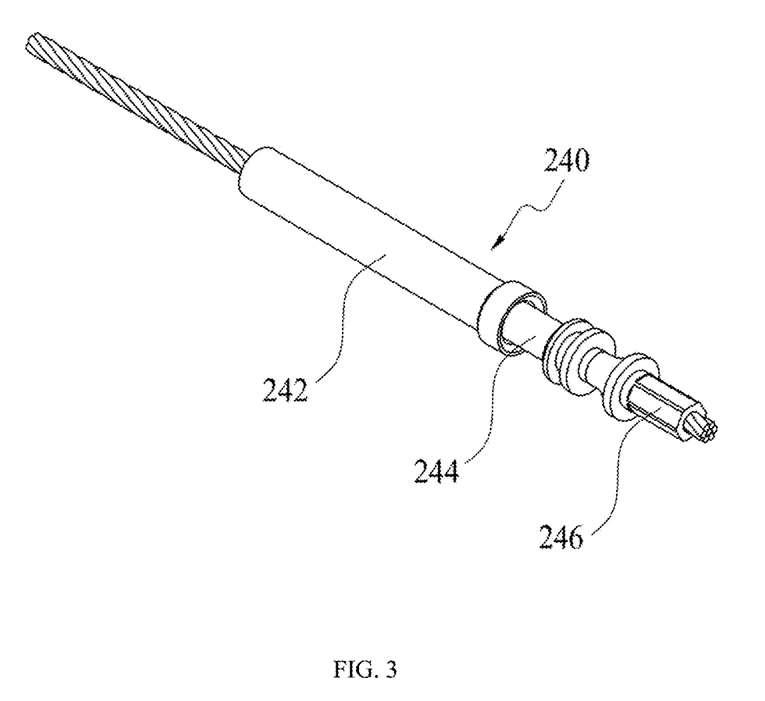
FIG. 3 is a drawing to illustrate a moving part in a pressure unit of a lap pretensioner including a structure to limit gas emissions according to one embodiment of the present invention.
Figure 4:
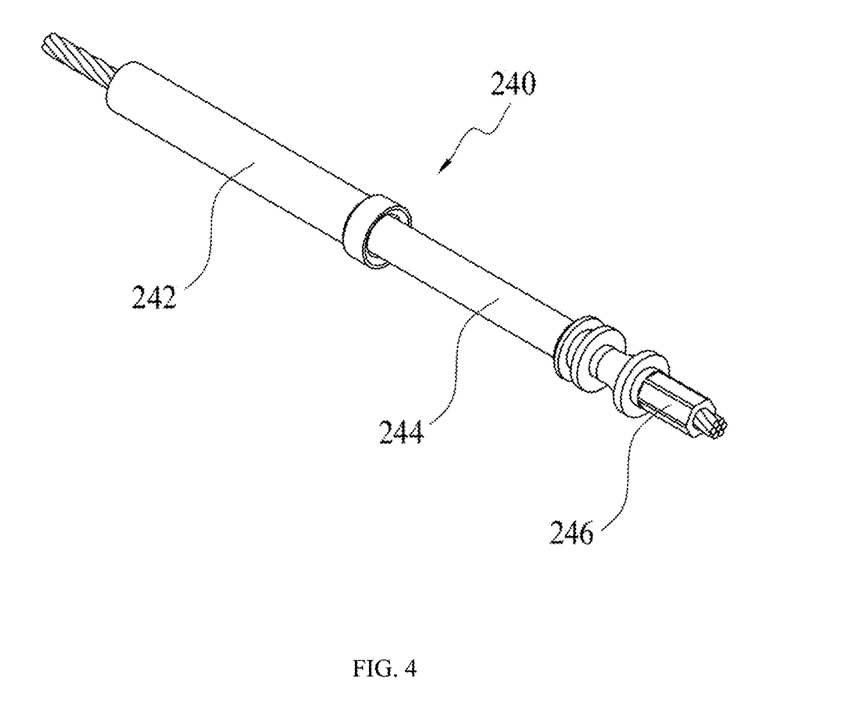
FIG. 4 is a drawing to illustrate a variable structure of a moving part in a pressure unit of a lap pretensioner including a structure to limit gas emissions, according to one embodiment of the present invention.
Figure 5A:
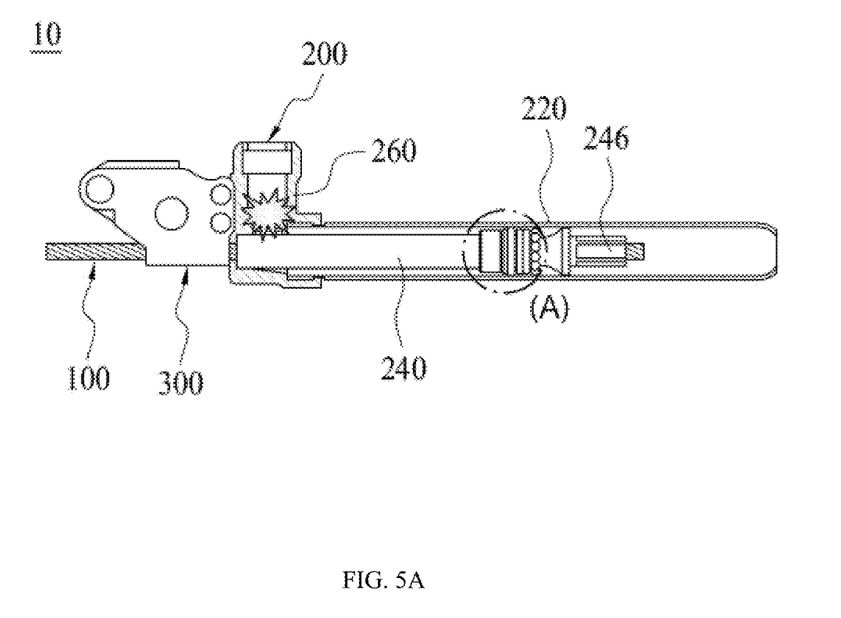
Figure 5B:
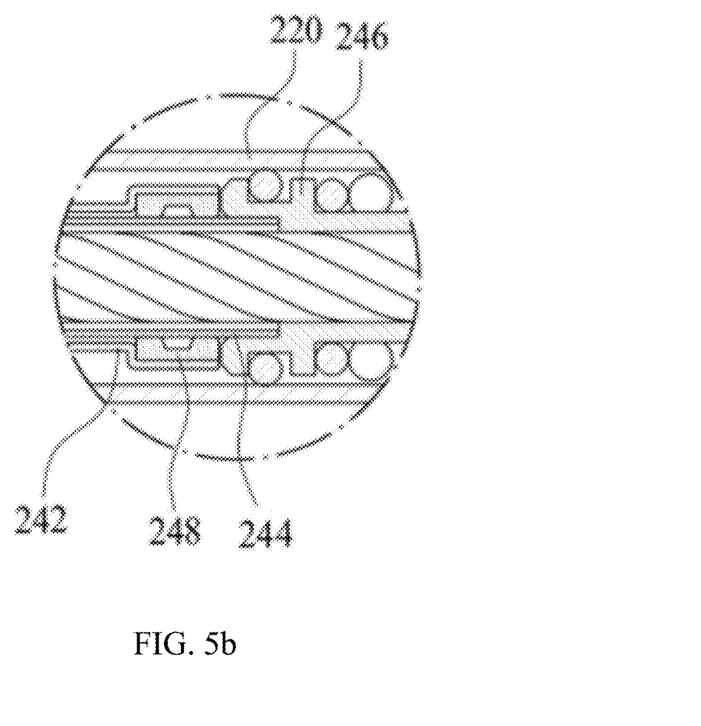
Figure 6A:
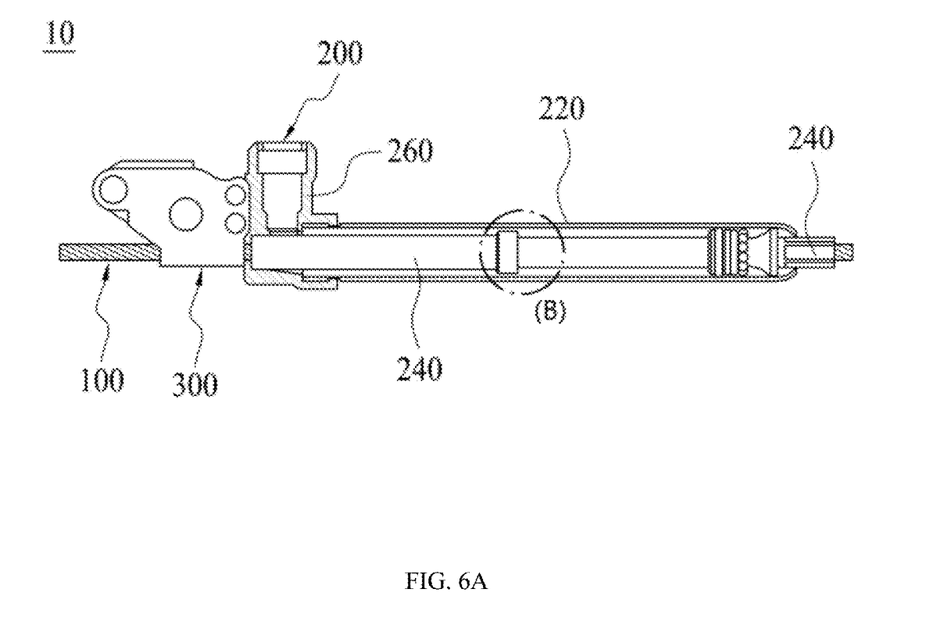
Figure 6B:
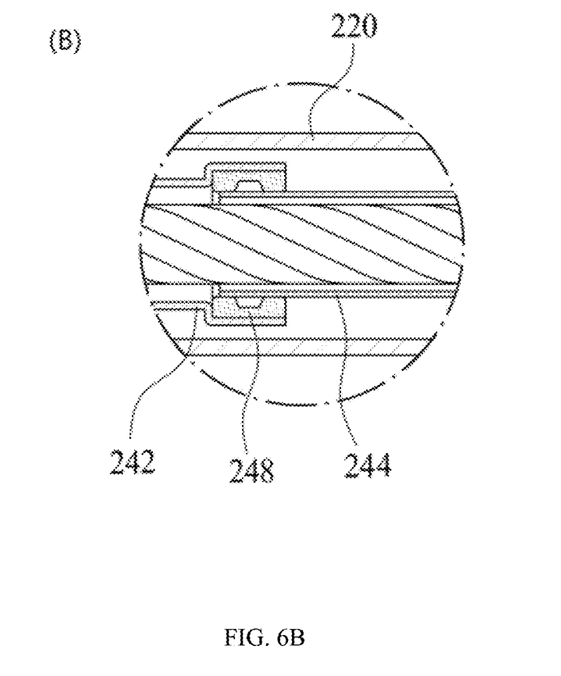

FIG. 1 is a drawing to illustrate a conventional lap pretensioner; FIG. 2 is a drawing to illustrate a lap pretensioner including a structure to limit gas emissions, according to one embodiment of the present invention; FIG. 3 is a drawing to illustrate a moving part in a pressure unit of a lap pretensioner including a structure to limit gas emissions according to one embodiment of the present invention; FIG. 4 is a drawing to illustrate a variable structure of a moving part in a pressure unit of a lap pretensioner including a structure to limit gas emissions, according to one embodiment of the present invention; FIG. 5A through 7B are drawings intended to illustrate an operational state of a lap pretensioner including a structure for limiting gas emissions, in accordance with one embodiment of the present invention.

As shown in FIG. 2 through FIG. 4, a lap pretensioner 10 including a structure to limit gas emissions in accordance with one embodiment of the present invention may comprise a connection unit 100, a pressure unit 200.

As shown in FIG. 2 through FIG. 4, a lap pretensioner 10 including a structure to limit gas emissions in accordance with one embodiment of the present invention may comprise a connection unit 100, a pressure unit 200.

A lap pretensioner 10 including a structure to limit gas emissions according to one embodiment of the present invention is a lap pretensioner 10 that is actuated by an impact applied to a vehicle, as described above, to move an anchor or buckle of the vehicle, wherein a webbing is connected to the anchor or buckle to limit withdrawal of the webbing when the lap pretensioner 10 is actuated.

The webbing described above may be a lap belt for restraining the waist of an occupant, and it will be appreciated that if the lap belt can be drawn into the lap pretensioner 10 and the withdrawal of the lap belt can be restricted, then all are within the scope of the present invention, even if the lap belt is drawn directly into the lap pretensioner 10.

The connection unit 100 may be arranged to receive an anchor or buckle into the lap pretensioner 10, and may also be arranged to receive a webbing, such as a wrap belt, connected to the anchor or buckle described above.

The connection unit 100 may be arranged in the form of a cable with a predetermined diameter and may be connected to an anchor or buckle by a medium.

By way of illustration, when the webbing is a lap belt, the connection unit 100 may be arranged to have a path on one side parallel to the interior space of the pressure unit 200 to be described later for efficient space utilization, while the other side may be arranged to vertically descend to an anchor or buckle provided on one side of the seat of the vehicle to effectively limit the withdrawal of the lap belt.

In other words, the connection unit 100 is arranged to move in a first path perpendicular to the paths of the case part 220 and the moving part 240 of the pressure unit 200, which will be described later, and then move to the moving part 240, thereby effectively limiting the withdrawal of the wrap belt while minimizing the volume of the lap pretensioner 10.

The pressure unit 200 may include a case part 220, a moving part 240, and an actuation part 260, and may further include a micro gas generator (MGG).

The pressure unit 200 may have a space formed in the interior of the case part 220 into which a portion of the connection unit 100 described above may be inserted.

The pressure unit 200 then activates the MGG to inject fluid into the interior space due to the impact of the vehicle.

Accordingly, the pressure unit 200 can pull the anchor or buckle by moving one end of the connection unit 100 in one direction based on the pressure of the fluid contained therein.

In this case, the pressure unit 200 may be arranged to form a variable space within the interior of the inner space, and to move the fluid described above along the interior of the variable space.

Specifically, the pressure unit 200 may be arranged to allow fluid to move along the variable space described above without leaking to the outside when the pressure in the interior space is below a predetermined pressure.

In this case, the pressure unit 200 may be arranged to leak fluid from the variable space when the pressure in the interior space exceeds a predetermined pressure For this purpose, the pressure unit 200 may include a case part 220, a moving part 240, and an actuation part 260, wherein the case part 220 may be elongate to allow a one end part of the connection unit 100 to be inserted and moved.

Specifically, the case part 220 is elongated to have a straight path, and a connection portion for connection with the connection unit 100 may be formed.

In addition, the case part 220 is arranged so that one side of the moving part 240 to be described later, which was inside, partially protrudes outside the case part 220 when the pressure in the interior space exceeds a preset pressure, thereby preventing breakage and dislodgment of the parts of the lap pretensioner 10 under abnormal operating conditions, thereby preventing secondary accidents.

In this case, the moving part 240 is fixed inside the case part 220 described above on one side of the internal space of the case part 220, and the other side moves to the other side of the internal space according to the movement of the connection unit 100, and can form a fluid movement path that varies in the longitudinal direction of the case part 220, that is, a variable space.

And the actuation part 260 may be in connection with the interior space of the case part 220 and may be actuated in response to an impact on the vehicle to form a space that injects fluid toward the interior space of the case part 220.

The pressure unit 200 described above may further comprise an MGG (Micro Gas Generator), which may be in a standby state in an initial state before an impact is applied to the vehicle, but when actuated by an impact applied to the vehicle, fluid is moved along the actuation part 260, and fluid is received in the interior space of the case part 220.

The structure for forming the variable space of the moving part 240 is described in more detail below.

The moving part 240 may be arranged in a variety of forms, provided that a variable space can be formed to form a fluid path of variable length.

However, by way of further illustration, the moving part 240 may be arranged as a series of interconnected telescoping hollow tubes of variable length.

Specifically, the moving part 240 may include a fixed member 242, a variable member 244, and a piston member 246, wherein the fixed member 242 is fixed to one side of the interior space of the case part 220 and is arranged to allow fluid to flow into the interior.

The variable member 244 may be arranged to slide in the direction of movement of the connection unit 100 relative to the fixed member 242.

It will be appreciated that the variable member 244 is first connected to be in communication with the interior of this fixed member 242, so that fluid is transferred to the interior.

Accordingly, the piston member 246 may be connected with the connection unit 100 to form a variable space that varies with movement of the connection unit 100 and may seal the other end of the variable member 244.

In other words, the interior space may be divided into a first space in which the fixed member 242 is fixed and a second space in which the variable member 244 is moved, which may be separated by the piston member 246.

Thus, as shown in the operational state of FIG. 5A through FIG. 7, the pressure of the fluid contained in the first space causes the variable member 244 and the piston member 246 to move into the second space, thereby moving a first portion of the connection unit 100 and thereby pulling on the anchor or buckle connected to the connection unit 100.

In a pressure unit 200 having a configuration as described above, the variable member 244 may separate from the fixed member 242 in an abnormal operating situation where the pressure in the interior space exceeds a predetermined pressure, and fluid may leak into the separated space.

For example, the pressure unit 200 may further include a sealing connection member 248 that is secured to an inner surface first side of the fixed member 242.

The variable member 244 may be connected to the sealing connection member 248 described above, such that the end is not disengaged from the fixed member 242 by the sealing connection member 248 when the pressure in the interior space is below a predetermined pressure, and may be arranged to prevent fluid leakage.

Specifically, the sealing connection member 248 may be arranged in the form of an annulus, with protrusions 248a, 248b having curvature in at least one region at one end and at the other end of the inner circumferential surface spaced apart by a predetermined distance.

Between the protrusions 248a, 248b, a groove 248c is formed, and when the pressure in the interior space is below a predetermined pressure, when the variable member 244 is moved, the protrusion formed at one time of the variable member 244 is caught in the groove 248c, and the variable member 244 is not dislodged from the fixed member 242, and the fluid leakage can be prevented twice by the protrusions 248a, 248b.

Figure 7A:
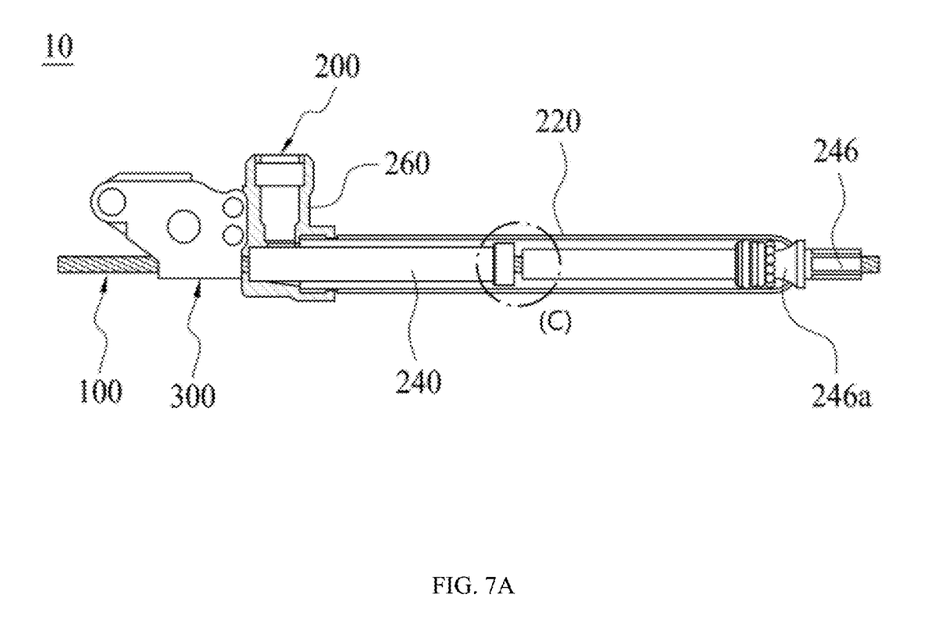
Figure 7B:
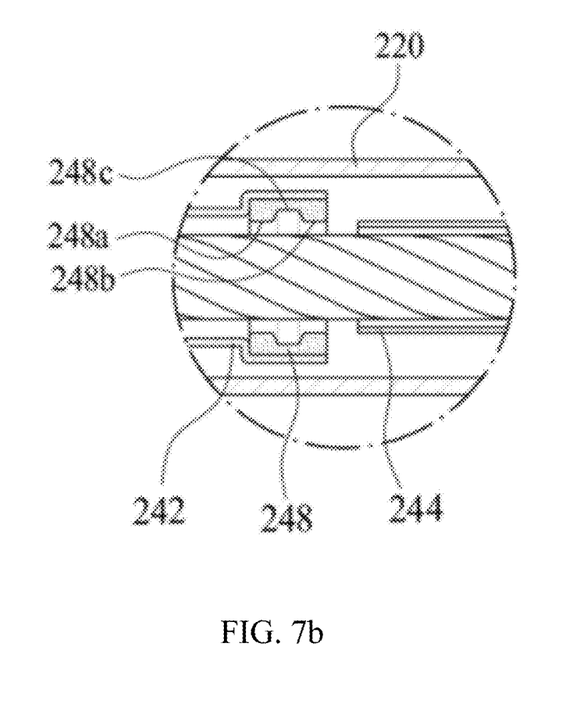

As described above, when the pressure in the interior space exceeds a predetermined pressure, the variable member 244 may be disengaged from the fixed member 242 without breaking the variable member 244 and the fixed member 242 by protrusions 248a, 248b having curvature in at least one region, as shown in FIG. 7A and FIG. 7B.

Furthermore, the pressure unit 200, as shown in FIG. 7A and FIG. 7B. may protrude outwardly from the case part 220 when the safety region 246a formed on the piston member 246 of the moving part 240 located within the interior space is exceeded in order to prevent secondary accidents by preventing breakage and dislodgment of the parts of the lap pretensioner 10 under abnormal operating conditions, as described above.

The case part 220 may be formed with a through-hole having a first diameter having a center axis in the longitudinal direction of the case part 220 so that one side of the moving part 240 to be described later that was inside may partially protrude outside the case part 220 when the pressure in the interior space is above a predetermined pressure In this case, the piston member 246 may be formed with a second diameter that is smaller than the first diameter described above on one side and arranged to protrude out of or retract back into the through-hole of the case part 220.

Furthermore, the other side of the piston member 246 may be arranged such that the limit region formed by the third diameter larger than the first diameter described above does not protrude outside the through-hole of the case part 220 when the pressure in the interior space of the case part 220 is below a predetermined pressure, that is, when the piston member 246 is operating in a steady state.

At this time, a safety region 246a may be formed on one side of the limit region of the piston member 246, so that it can be naturally dislodged outside the through-hole of the case part 220 in the abnormal operating condition described above, as shown in FIG. 8a and FIG. 8b.

For example, the safety region 246a may be arranged in the form of a column of progressively increasing diameter toward the through-hole of the case part 220 on one side of the limit zone, thereby preventing breakage of the case part 220 under the abnormal operating conditions described above.

Alternatively, the moving part 240 according to one embodiment of the present invention may be telescoped as described above to form a variable space, or it may be integrally arranged, although not shown in the drawings, provided that it is arranged to form a variable space and to leak fluid in the desired direction only under non-normal operating conditions.

For example, the moving part 240 may be arranged in the form of a hollow tube with a corrugation having a variable length from one end to the other, and the piston member 246 described above may be combined therewith, all of which will be said to fall within the scope of the present invention.

The lap pretensioner 10 including a structure to limit gas emissions according to one embodiment of the present invention having a configuration as described above, may further include an exhaust unit 300.

For example, the exhaust unit 300 may be arranged to exhaust the fluid contained within the pressure unit 200 in a direction opposite to the position of an occupant of the vehicle.

For example, the exhaust unit 300 may be disposed at one end of the case part 220, and an exhaust port may be formed to exhaust the fluid injected into the interior space in the abnormal operating state described above in a direction different from the longitudinal direction of the case part 220.

The orientation of the exhaust vents may vary, but it may be convenient to arrange them to exhaust in a perpendicular direction to the longitudinal direction of the case part 220.

The exhaust unit 300 may be in communication with the first space described above in the interior space such that fluid injected into the interior space may be exhausted through the exhaust outlet described above.

Thus, a lap pretensioner 10 including a structure that limits gas emissions according to one embodiment of the present invention can completely prevent MGG emissions under normal operating conditions, thereby preventing passenger safety accidents.

It can also prevent secondary accidents by preventing parts from breaking and dislodging from the lap pretensioner 10 during abnormal operating conditions.

In addition, it does not deviate much from the geometry of conventional lap pretensioners, so it is easy to apply directly to current production vehicles.

A preferred embodiment of the present invention has been described as above and a fact that the present invention can be materialized in other specific forms without departing from the gist or scope in addition to the above described embodiment is apparent to those skilled in the art.

Therefore, the aforementioned embodiment is not limited but should be considered to be illustrative, and as a result, the present invention is not limited to the above description and may be modified within the scope of the appended claims and a range equivalent thereto.

The invention claimed is:

1. A lap pretensioner including a structure to limit gas emissions that is actuated by an impact on the vehicle to move the vehicle's anchors or buckles, comprising:
   a connecting unit connected with the anchor or the buckle; and
   a pressure unit having an interior space formed therein into which a portion of the connecting unit is inserted, actuated by an impact on the vehicle to inject a fluid into the interior space, and moving a portion of the connecting unit in one direction under pressure of the fluid received therein to pull the anchor or the buckle,
   wherein the pressure unit is provided inside the interior space, and configured to allow fluid to move along the inside of a variable space that varies in response to the movement of the connecting unit,
   wherein the pressure unit is configured that the fluid moves along the variable space when the pressure is below a predetermined value, and leaks from the variable space when the predetermined value is exceeded, and
   wherein the pressure unit includes
      a case part elongately formed to allow insertion and movement of one end of the connection unit;
      a moving part having one side fixed to one side of the interior space inside the case part, and the other side moved to the other side of the interior space upon movement of the connection unit to form the variable space; and
      an actuation part connecting to the interior space of the case part, and actuated in response to an impact on the vehicle, and injecting fluid toward the interior space of the case part,
      wherein the moving part is formed by a multi-stage telescopic hollow tube connected in series, and has variable length.

2. The lap pretensioner including a structure to limit gas emissions of claim 1, wherein the moving part includes
   a fixed member arranged to receive the fluid into the interior, and fixed to one side of the interior space;
   a variable member having one end part connected to the interior of the fixed member, and arranged to slide in the direction of movement of the connection unit relative to the fixed member; and
   a piston member connected with the connection unit, and enclosing the other end part of the variable member, and forms the variable space that varies with movement of the connection unit.

3. The lap pretensioner including a structure to limit gas emissions of claim 2, wherein the piston member is arranged to separate the interior space into a first space in which the fixed member is fixed and a second space in which the variable member is moved,
   and wherein the variable member and the piston member are moved into the second space by the pressure of the fluid contained in the first space, thereby moving one end of the connecting unit.

4. The lap pretensioner including a structure to limit gas emissions of claim 1, wherein the pressure unit is arranged to leak the fluid into a disconnected space as the variable member is disconnected from the fixed member when the predetermined pressure is exceeded.

5. The lap pretensioner including a structure to limit gas emissions of claim 4, wherein the pressure unit is arranged so that a safety region of the movable part located within the interior space protrudes outside the case part when the predetermined pressure is exceeded.

6. The lap pretensioner including a structure to limit gas emissions of claim 1 further comprising an exhaust unit that the fluid contained within the pressure unit exhausts in a direction opposite to the position of an occupant of the vehicle.

7. The lap pretensioner including a structure to limit gas emissions of claim 1, wherein the pressure unit is configured that the fluid moves along the variable space when the pressure is below a predetermined value, and leaks from the variable space when the predetermined value is exceeded.

8. A lap pretensioner including a structure to limit gas emissions that is actuated by an impact on the vehicle to move the vehicle's anchors or buckles, comprising:
a connecting unit connected with the anchor or the buckle; and
a pressure unit having an interior space formed therein into which a portion of the connecting unit is inserted, actuated by an impact on the vehicle to inject a fluid into the interior space, and moving a portion of the connecting unit in one direction under pressure of the fluid received therein to pull the anchor or the buckle,
wherein the pressure unit is provided inside the interior space, and configured to allow fluid to move along the inside of a variable space that varies in response to the movement of the connecting unit,
wherein the pressure unit includes
a case part elongately formed to allow insertion and movement of one end of the connection unit;
a moving part having one side fixed to one side of the interior space inside the case part, and the other side moved to the other side of the interior space upon movement of the connection unit to form the variable space; and
an actuation part connecting to the interior space of the case part, and actuated in response to an impact on the vehicle, and injecting fluid toward the interior space of the case part,
wherein the moving part is formed by a multi-stage telescopic hollow tube connected in series, and has variable length.

9. The lap pretensioner including a structure to limit gas emissions of claim 8, wherein the moving part includes
a fixed member arranged to receive the fluid into the interior, and fixed to one side of the interior space;
a variable member having one end part connected to the interior of the fixed member, and arranged to slide in the direction of movement of the connection unit relative to the fixed member; and
a piston member connected with the connection unit, and enclosing the other end part of the variable member, and forms the variable space that varies with movement of the connection unit.

10. The lap pretensioner including a structure to limit gas emissions of claim 9, wherein the piston member is arranged to separate the interior space into a first space in which the fixed member is fixed and a second space in which the variable member is moved,
and wherein the variable member and the piston member are moved into the second space by the pressure of the fluid contained in the first space, thereby moving one end of the connecting unit.

11. The lap pretensioner including a structure to limit gas emissions of claim 8, wherein the pressure unit is arranged to leak the fluid into a disconnected space as the variable member is disconnected from the fixed member when the predetermined pressure is exceeded.

12. The lap pretensioner including a structure to limit gas emissions of claim 11, wherein the pressure unit is arranged so that a safety region of the movable part located within the interior space protrudes outside the case part when the predetermined pressure is exceeded.

13. The lap pretensioner including a structure to limit gas emissions of claim 8, further comprising an exhaust unit that the fluid contained within the pressure unit exhausts in a direction opposite to the position of an occupant of the vehicle.

14. A lap pretensioner including a structure to limit gas emissions that is actuated by an impact on the vehicle to move the vehicle's anchors or buckles, comprising:
a connecting unit connected with the anchor or the buckle; and
a pressure unit having an interior space formed therein into which a portion of the connecting unit is inserted, actuated by an impact on the vehicle to inject a fluid into the interior space, and moving a portion of the connecting unit in one direction under pressure of the fluid received therein to pull the anchor or the buckle,
wherein the pressure unit is provided inside the interior space, and configured to allow fluid to move along the inside of a variable space that varies in response to the movement of the connecting unit,
wherein the pressure unit includes
a case part elongately formed to allow insertion and movement of one end of the connection unit;
a moving part having one side fixed to one side of the interior space inside the case part, and the other side moved to the other side of the interior space upon movement of the connection unit to form the variable space; and
an actuation part connecting to the interior space of the case part, and actuated in response to an impact on the vehicle, and injecting fluid toward the interior space of the case part, and
wherein the pressure unit is arranged to leak the fluid into a disconnected space as the variable member is disconnected from the fixed member when the predetermined pressure is exceeded.

15. The lap pretensioner including a structure to limit gas emissions of claim 14, wherein the pressure unit is arranged so that a safety region of the movable part located within the interior space protrudes outside the case part when the predetermined pressure is exceeded.

16. The lap pretensioner including a structure to limit gas emissions of claim 14, further comprising an exhaust unit that the fluid contained within the pressure unit exhausts in a direction opposite to the position of an occupant of the vehicle.

* * * * *